(12) United States Patent
Dua (10) Patent No.: US 8,537,884 B2
(45) Date of Patent: Sep. 17, 2013

(54) SINGLE PATH DETECTION AND EQUALIZER OPTIMIZATION

(75) Inventor: Aditya Dua, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 253 days.

(21) Appl. No.: 13/069,675

(22) Filed: Mar. 23, 2011

(65) Prior Publication Data

US 2012/0128054 A1    May 24, 2012

Related U.S. Application Data

(60) Provisional application No. 61/415,741, filed on Nov. 19, 2010.

(51) Int. Cl.
*H04L 27/01* (2006.01)

(52) U.S. Cl.
USPC ........... 375/232; 375/316; 375/229; 375/230; 375/234; 375/235; 375/346; 375/348; 375/349

(58) Field of Classification Search
USPC ............... 375/316, 232, 229, 230, 234, 235, 375/346, 348, 349
See application file for complete search history.

(56) References Cited

U.S. PATENT DOCUMENTS

| | | | |
|---|---|---|---|
| 6,233,276 B1 * | 5/2001 | Simeon | 375/232 |
| 6,907,092 B1 * | 6/2005 | Yakhnich et al. | 375/346 |
| 7,065,371 B1 * | 6/2006 | Kleinerman | 455/464 |
| 7,532,692 B2 * | 5/2009 | Hwang | 375/350 |
| 7,733,951 B2 * | 6/2010 | Tsuie et al. | 375/233 |
| 2004/0161029 A1 * | 8/2004 | Malladi et al. | 375/232 |
| 2008/0300027 A1 * | 12/2008 | Dou et al. | 455/574 |
| 2010/0172396 A1 | 7/2010 | Cairns et al. | |

FOREIGN PATENT DOCUMENTS

| | | |
|---|---|---|
| EP | 2012439 A2 | 1/2009 |
| FR | 2930704 A1 | 10/2009 |

OTHER PUBLICATIONS

International Search Report and Written Opinion—PCT/US2011/061465—ISA/EPO—Mar. 28, 2012.

* cited by examiner

*Primary Examiner* — Siu Lee
(74) *Attorney, Agent, or Firm* — Stanton Braden (57) ABSTRACT

An algorithm to detect single path channel conditions and reduce the span (number of taps) of the equalizer in order to mitigate the performance degradation caused by noisy equalizer taps is disclosed. The algorithm provides two novel components comprising single path scenario detection and single path scenario processing or (equalizer shortening). A single path scenario is detected when the energy concentrated in a single channel impulse response tap divided by the total energy of the taps exceeds a predetermined threshold. When a single path scenario is detected, only the equalizer taps within a variable window around the equalizer tap having concentrated energy are used to filter the received signal.

32 Claims, 6 Drawing Sheets

SINGLE PATH DETECTION AND EQUALIZER OPTIMIZATION

CLAIM OF PRIORITY UNDER 35 U.S.C. §119

The present application for patent claims priority to Provisional Application No. 61/415,741 entitled "Single Path Detection and Equalizer Optimization" Nov. 19, 2010, and assigned to the assignee hereof and hereby expressly incorporated by reference herein.

BACKGROUND

1. Field

The present invention relates generally to wireless communications, and more specifically to equalization of received signals in wireless communication devices.

2. Background

Communications systems are used for transmission of information from one device to another. Prior to transmission, information is encoded into a format suitable for transmission over a communication channel. The transmitted signal is distorted as it travels through the communication channel. The signal also experiences degradation from noise and interference acquired during transmission. An example of interference commonly encountered in band-limited channels is called inter-symbol interference (ISI). ISI occurs as a result of the spreading of a transmitted symbol pulse due to the dispersive nature of the channel, which results in an overlap of adjacent symbol pulses. Another example of interference is performance degradation internal to the receiver itself such as interference caused by noisy equalizer taps. The received signal is decoded and translated into the original pre-encoded form. Both the transmitter and receiver are designed to minimize the effects of channel imperfections and internal interference. For the purposes of this disclosure, interference or distortion due to channel imperfections, internal interference, or any combination thereof will be referred to generally as noise.

Various receiver designs may be implemented to compensate for noise caused by the transmitter and the channel. By way of example, an equalizer is a common choice for correcting ISI. An equalizer corrects for distortions and generates an estimate of the transmitted symbol. In the wireless environment, equalizers are required to handle time-varying channel conditions. Ideally, the response of the equalizer adjusts to changes in channel characteristics. Equalizers are generally complex, tending to increase the power consumption of a communication device and introduce internal interference. Equalization is a key aspect of any WCDMA downlink receiver. Due to the large bandwidth used for WCDMA communications, the frequency selective behavior of the wireless channel is a concern and must be compensated for at the receiver using equalization techniques.

Current equalizer implementations comprise an Finite Impulse Response (FIR) filter with chip-spaced complex taps, which are updated periodically. The equalizer taps are computed using a frequency domain algorithm, which is essentially a low complexity approximation of the true minimum mean squared error (MMSE) equalizer. Because the channel impulse response (CIR) and covariance estimates used to compute the equalizer taps are noisy due to estimation errors (even after filtering), the noise propagates to the equalizer taps and results in performance degradation. Regardless of the operating channel conditions, a fixed number of equalizer taps are always computed.

However, in a single path (equivalently, frequency flat) channel, just one equalizer tap is sufficient to mitigate the ISI and other distortion introduced by the wireless channel. In this case, the remaining equalizer taps merely act as a source of noise and degrade the Signal to Noise Ratio (SNR) at the output of the equalizer. The impact is especially visible in high geometry conditions, where the noisy equalizer taps become the dominant noise source. An improved equalizer design would reduce power consumption and its own internal interference, as well as provide optimum performance under various channel conditions.

There is therefore a need in the art for a method and apparatus to detect single path channel conditions and reduce the span (number of taps) of the equalizer in order to mitigate the performance degradation caused by noisy equalizer taps.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The terms "mobile device", "wireless device" and "user equipment" as used herein refers to a wireless communication device such as a cellular telephone, wireless terminal, user equipment, laptop computer, High Data Rate (HDR) subscriber station, access terminal, or other personal communication system (PCS) device. The device may be either mobile or stationary.

An algorithm to proactively detect single path scenarios and reduce the span (number of taps) of the equalizer in order to reduce power consumption and mitigate the performance degradation caused by noisy equalizer taps is disclosed. The algorithm provides two novel components comprising single path scenario detection and single path scenario processing or (equalizer shortening) detailed in FIGS. 2-4.

Figure 1:
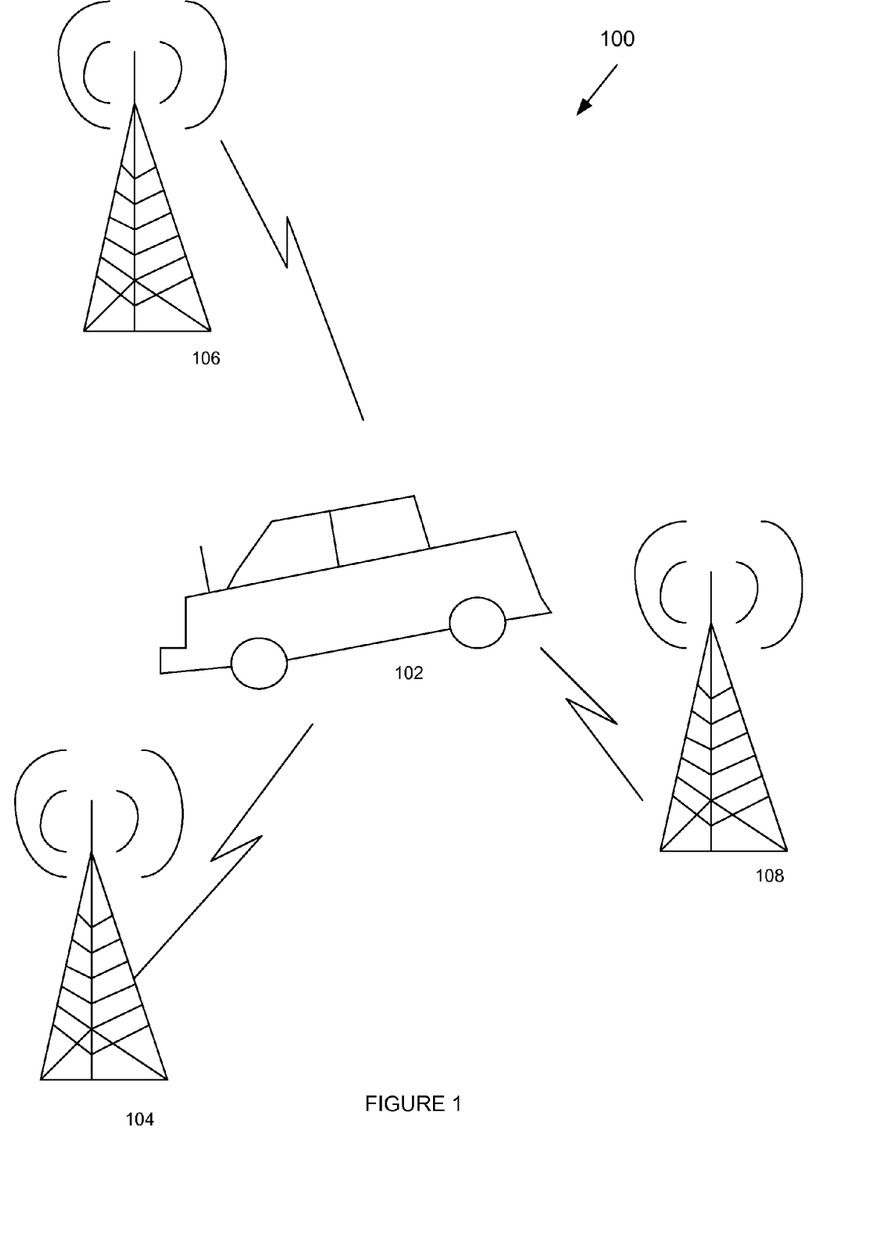
FIG. 1 is a diagram illustrating an example of a broadcast network in which single path detection and equalizer optimization can be used.

FIG. 1 is a diagram illustrating an example of a wireless communications network in which single path detection and equalizer optimization can be used. As seen in FIG. 1, wireless communications network 100 includes multiple base stations 104, 106 and 108 for transmitting wireless communications signals. Signals and data can be broadcast by base stations 104, 106 and 108 to supply user content and information. For example, streaming video, games or data for other applications may be delivered over the wireless network. A receiver User Equipment (UE) 102 receives the data for consumption by the user. In this example, the receiver 102 is depicted as hosted by a car. However, receiving station 102 should not be limited as such, and can also represent, for example, a person, another mobile entity/device, or a stationary entity/device. Furthermore, the receiver can represent a computer, a laptop computer, a telephone, a mobile telephone, a personal digital assistant (PDA), an audio player, a game console, a camera, a camcorder, an audio device, a video device, a multimedia device, a component(s) of any of the foregoing (such as a printed circuit board(s), an integrated circuit(s), and/or a circuit component(s)), or any other device capable of supporting single path detection and equalizer optimization. A host system can be stationary or mobile, and it can be a digital device.

Figure 2:
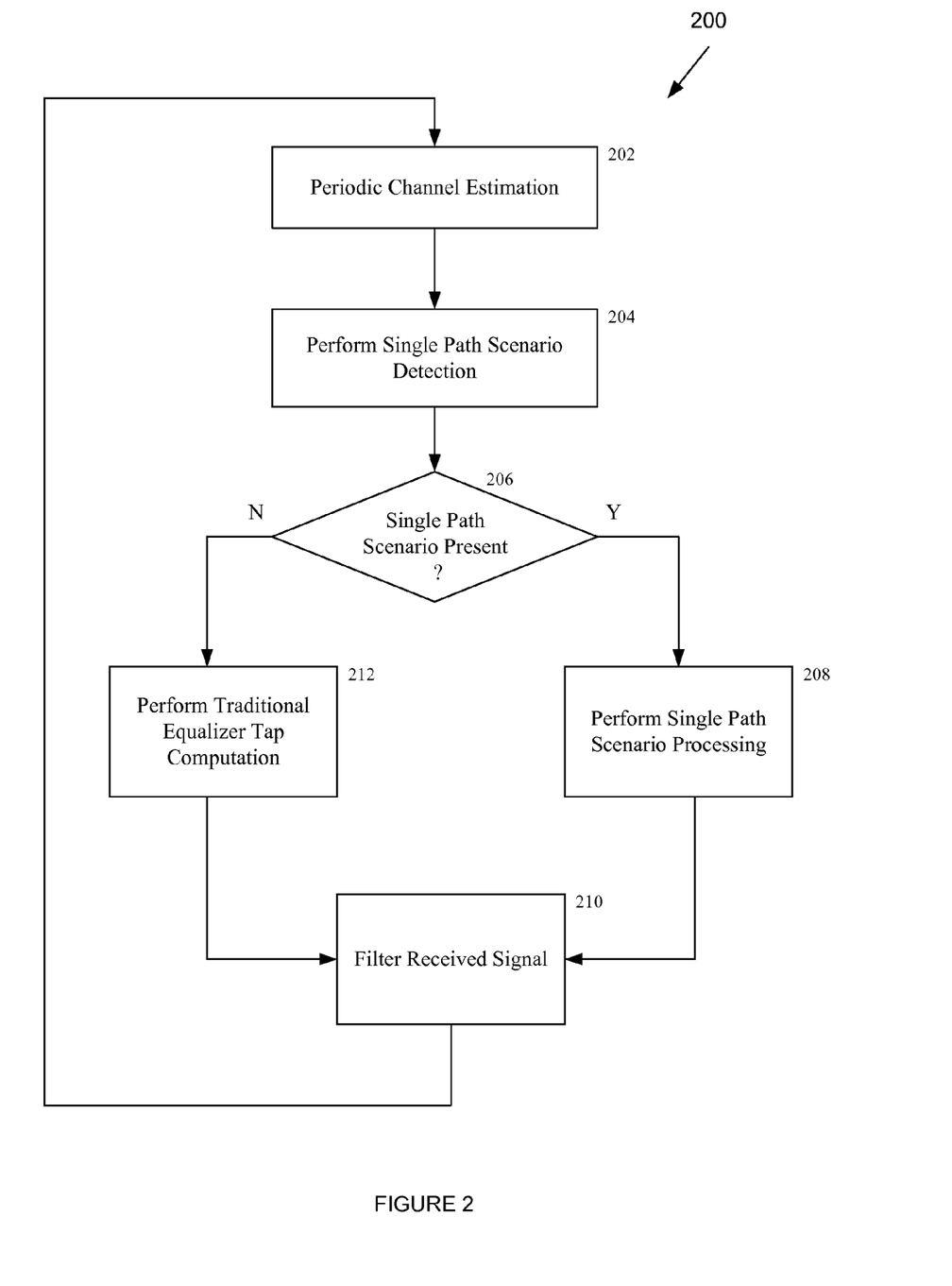
FIG. 2 is an exemplary flowchart illustrating single path detection and equalizer optimization.

FIG. 2 illustrates an exemplary overview of single path detection and equalizer optimization. Control flow begins in step 202 where periodic channel estimation is performed. Each time periodic channel estimation takes place, the equalizer determines if a single path scenario is present.

In step 204, the equalizer performs Single Path Scenario Detection. The total energy in the channel impulse responses from all the taps is calculated to produce a total energy value. The energy concentrated in the tap having the largest value is divided by the total energy value to produce a tap energy ratio. If the tap energy ratio is greater than a predetermined tap energy ratio threshold, most of the energy is concentrated in one channel tap, indicating that a Single Path Scenario is present. Single Path Scenario Detection is further detailed in FIG. 3. Control flow proceeds to step 206.

In step 206, if a single path scenario is present, control flow proceeds to step 208 where Single Path Scenario Processing is implemented to reduce power consumption and mitigate the performance degradation from unneeded equalizer taps. A reduced set of equalizer taps is computed in step 208 by a novel equalizer shortening algorithm. Single Path Scenario Processing is detailed in FIG. 4. Control flow then proceeds to step 210. If a Single Path Scenario has not been detected, control flow proceeds to step 212 where equalizer taps are computed according to traditional methods. Most common methods are based on minimum means squared error, which use the channel estimates and the covariance to compute the equalizer taps with a known algorithm, which produces a fixed number of taps. Control flow then proceeds to step 210.

In step 210, the received signal is filtered by the equalizer taps computed in either step 208 or 212. Control flow returns to step 202 for each periodic channel estimation.

Figure 3:
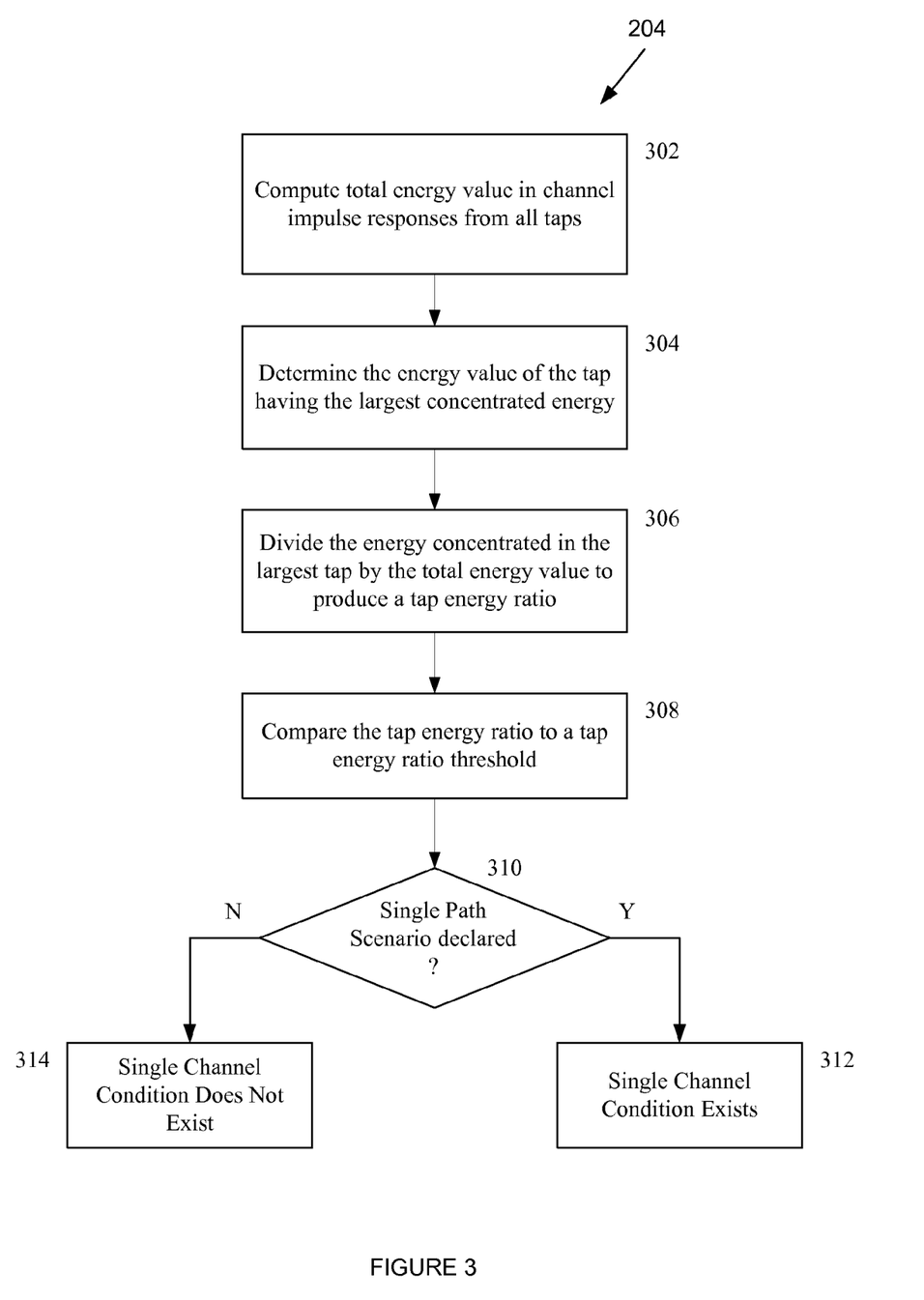
FIG. 3 is a flowchart detailing exemplary detection of a single channel condition.

FIG. 3 details an exemplary embodiment of single path scenario detection. The equalizer taps are computed periodically from a filtered, down-sampled (to chip rate) channel impulse response (CIR) estimate. In single path scenarios, a majority of the energy in the CIR is concentrated in just one tap. This important observation is used to detect a single path scenario according to the following steps.

In step 302, a total energy value is calculated from the CIRs of all the taps by the following equation:

Let $\{h(k), k=0, 1, \ldots, K-1\}$ denote the CIR estimate in the current equalizer update period, where K is the number of equalizer taps.

Compute the total energy in the CIR vector as $$E_{tot} = \sum_{k=0}^{K-1} \|h(k)\|^2 \quad \text{(Equ. 1)}$$

Control flow proceeds to step 304.
In step 304, the energy concentrated in the largest tap of the CIR vector is computed as $$E_{max} = \max_{k=0,\ldots,K-1} \|h(k)\|^2 \quad \text{(Equ. 2)}$$

Control flow proceeds to step 306.
In step 306, the energy concentrated in the largest tap is divided by the total energy in the CIR vector to produce a tap energy ration by the following equation:

Compute the ratio $$\eta = \frac{E_{max}}{E_{tot}} \quad \text{(Equ. 3)}$$

Control flow proceeds to step 306.
In step 308, the tap energy ratio is compared to a predetermined tap energy threshold according to:

If $\eta > \eta_{thresh}$, declare a single path scenario (Equ. 4)

Control flow proceeds to step 310.
In step 310, if a single path scenario has been declared, control flow proceeds to step 312 a single channel condition has been determined to exist. Otherwise, if a single path scenario has not been declared, control flow proceeds to step 314 where a single channel condition has not been determined.

In cases of reception with multiple antennas, single path scenario detection can be performed independently for each receive antenna. In other words, the above algorithm detects if the instantaneous channel realization appears to be a single path channel, independently for each receive antenna, based on steps 302, 304, 306, and 308

Figure 4:
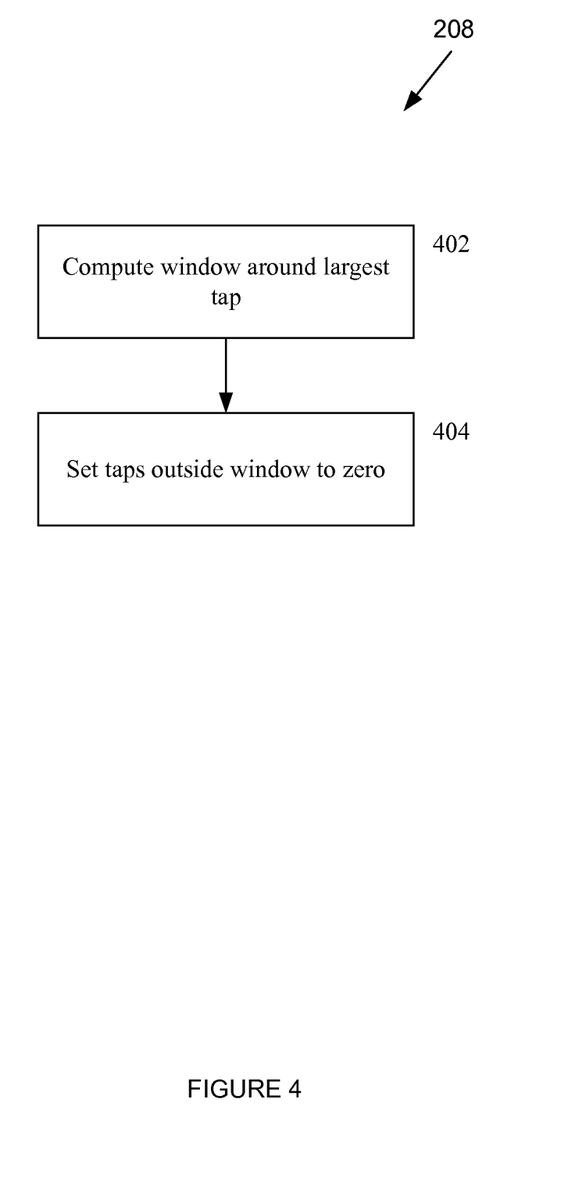
FIG. 4 is a flowchart detailing exemplary single channel equalizer processing.

FIG. 4 details an exemplary embodiment of single path scenario processing. When a single path scenario is detected, the computed equalizer taps are shortened (i.e., span of the equalizer is reduced) to eliminate potentially noisy taps. A very short equalizer is computed in order to equalize a close to single path channel. Specifically, the taps in a window around the largest equalizer tap are retained and the remaining equalizer taps are discarded.

In step 402, a window around the equalizer tap having the largest energy is computed as follows:

Let $\{c(k), k=0, 1, \ldots, K-1\}$ denote the equalizer taps computed for the current equalizer update period. Find the equalizer tap with the largest magnitude as $$k^* = \operatorname*{argmax}_{k=0,\ldots,K-1} \|c(k)\|^2 \quad \text{(Equ. 5)}$$

Control flow proceeds to step 404.
In step 404, the taps outside the window are set to zero to reduce the number of equalizer taps for filtering the received signal as follows:

For $k=0, 1, \ldots, K-1$, if $\max(0, k^*-W) \leq k \leq \min(K-1, k^*+W)$, set $c'(k)=c(k)$ set $c'(k)=0$ (Equ. 6)

otherwise, the modified equalizer taps viz. $\{c'(k), k=0, 1, \ldots, K-1\}$ are used for equalization in the current equalizer update period.

Thus, the equalizer shortening algorithm applies a rectangular window of size 2 W+1 around the equalizer tap with the largest magnitude and zeros out the taps outside the window. The equalizer shortening algorithm can be further fine tuned for performance by allowing for variable sized windowing. In particular, the length of the window can be allowed to depend on the quantity η computed in the single path scenario detection phase, therefore making the window smaller as a single path channel is more closely realized. In its most general form, the algorithm can be expressed as:

If $\eta < \eta_0$, no windowing, i.e., $c'(k)=c(k) \forall k$ (Equ. 7)

If $\eta_j \leq \eta < \eta_{j+1}$ for $j=0, 1, \ldots J-1$, use window size $W_j$ (Equ. 8)

If $\eta \geq \eta_{thresh}$, use window size $W_{min}$ (Equ. 9)

Where a monotonic window size is expected, i.e. $W_0 > W_1 > \ldots > W_{min}$.

Figure 5:
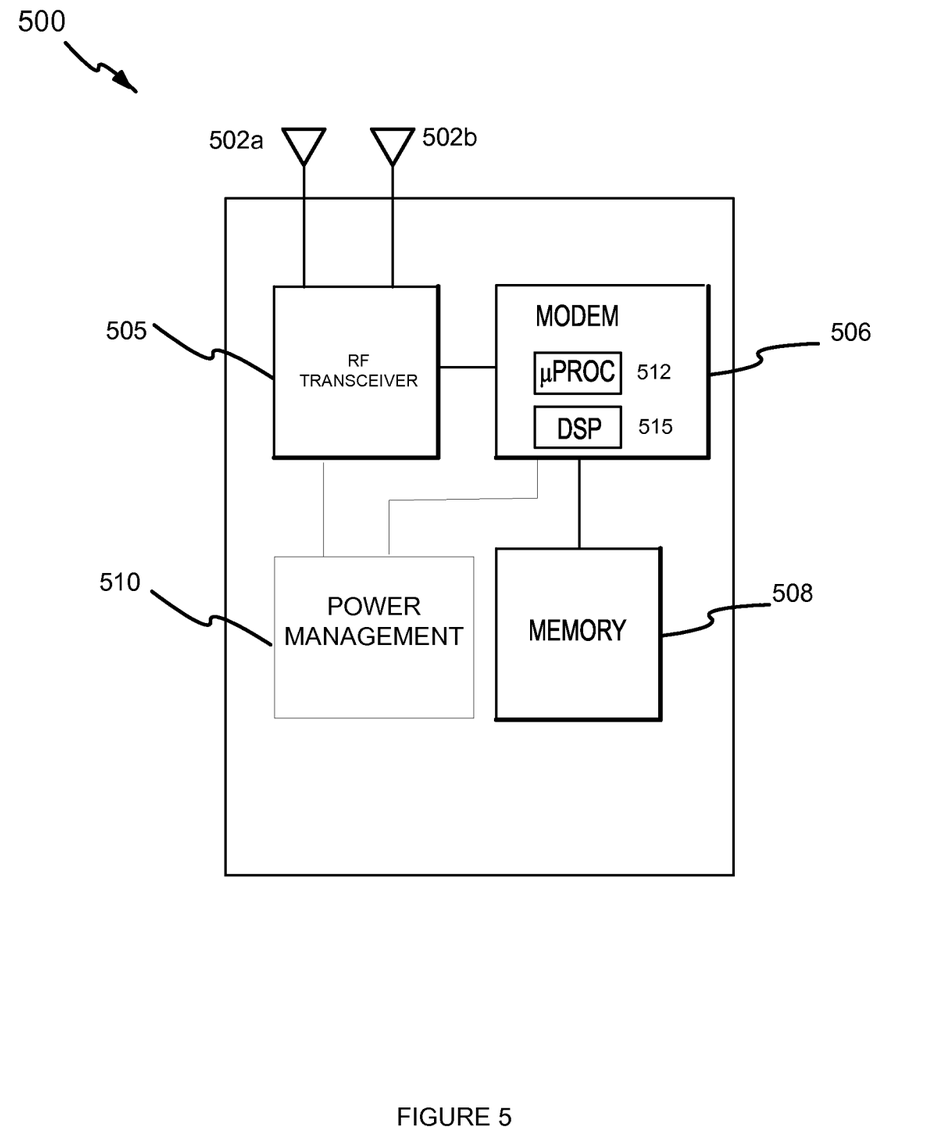
FIG. 5 is a block diagram illustrating an exemplary wireless device capable of single path detection and equalizer optimization.

FIG. 5 is a block diagram illustrating an exemplary wireless device capable of single path detection and equalizer optimization 500. Wireless device 500 comprises a wireless communication transceiver 504 and associated antennas 502a, 502b capable of sending and receiving wireless communication signals. Modem 506 comprises the appropriate microprocessor(s) 512, digital signal processor(s) 514 and other suitable hardware, such as a correlator bank, for processing signals. Power management 510 controls power for various components of wireless device 500. Memory 508 is coupled to modem 504 as necessary for implementing various modem processes and functionality for single path detection and equalizer optimization. Wireless device 500 may comprise an appropriate user interface with alphanumeric keypad, display, microphone, speaker, and other necessary components (not shown). It will be appreciated by those skilled in the art that wireless device 500 may comprise a variety of components not shown.

The methodology for single path detection and equalizer optimization described herein may be implemented by suitable instructions operating on the microprocessor 512 and memory 508 of wireless device 500, but is certainly not limited to such an implementation and may alternatively be implemented in hardware circuitry. The microprocessor 512 is connected to power management 510 and memory 508 having code or instructions directing the microprocessor 512 to perform single path detection and equalizer optimization. Memory 508 may comprise instructions for performing single path detection and equalizer optimization. The memory 508 may include RAM memory, flash memory, ROM memory, EPROM memory, EEPROM memory, registers, a hard disk, a removable disk, a CD-ROM, or any other form of storage medium or computer readable media known in the art. In an exemplary aspect, the control processor 512 executes instructions stored in memory 508 according to the steps of FIGS. 2-4 to perform single path detection and equalizer optimization.

Figure 6:
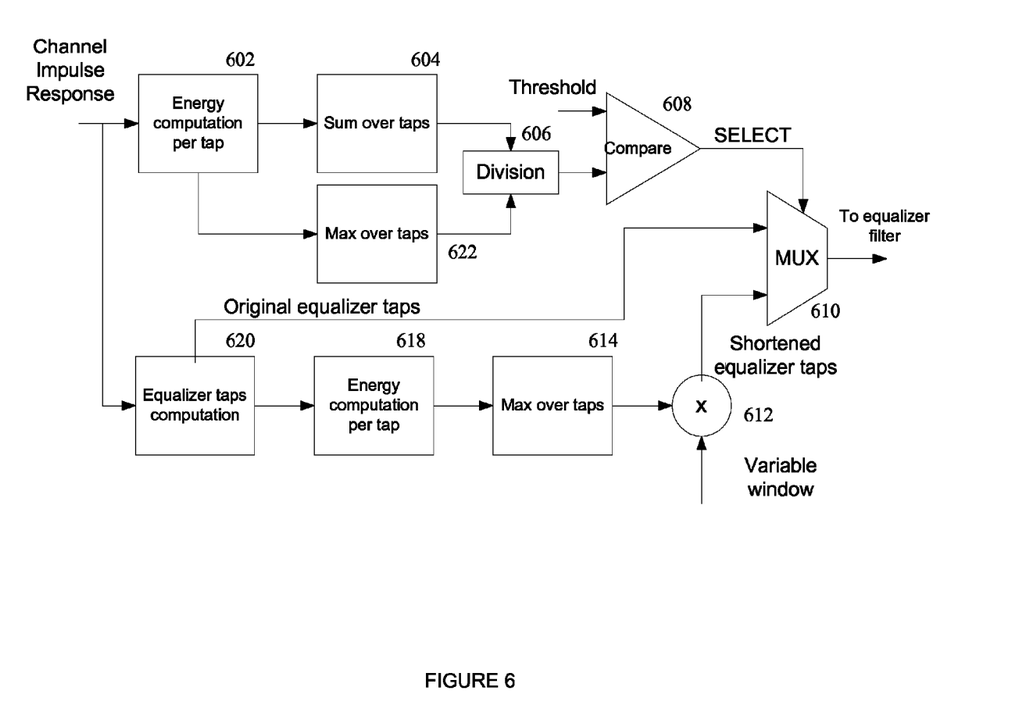
FIG. 6 is a high level block diagram of an exemplary hardware implementation capable of single path detection and equalizer optimization.

FIG. 6 is a high level block diagram of an exemplary hardware implementation capable of single path detection and equalizer optimization. Energy computation component 602 computes the energy in each CIR and outputs the energy computations to summer 604 as well as Maximum Energy Computation component 622. Summer 604 sums the energy over all of the equalizer taps to produce a total energy value, output to Divider 606. Energy computation component 622 computes a maximum CIR energy value for the equalizer tap having the largest concentrated energy, also output to Divider 606. Divider 606 divides the Maximum CIR energy value by the total energy value to produce a tap energy ratio for input to Comparator 608. Comparator 608 compares the tap energy ratio to an input tap energy ratio threshold value generating a binary decision value (SELECT) indicating whether or not the tap energy ratio exceeds the tap energy ratio threshold for input to Multiplexer 610. Multiplexer 610 comprises three inputs: the traditional equalizer taps output by Equalizer Taps Computation component 620, the shortened equalizer taps, and the SELECT value. Equalizer Taps Computation component 620 also outputs the traditional equalizer taps to Energy Computation Per Tap component 618, which computes the energy in each equalizer tap for input to Maximizer 614. Maximizer 614 determines the equalizer tap with the largest concentrated energy for input to Multiplier 612. Multiplier 612 applies a variable window size input to the traditional equalizer taps to generate the shortened equalizer taps for input to Multiplexer 610. Based on the SELECT value, Multiplexer 610 selects either the traditional or the shortened taps. The selected taps are then used to equalize the received signal.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed:

1. A method of equalizing a received wireless communications signal comprising:
   detecting a single path scenario;
   reducing a number of equalizer taps in a current equalizer update period using a variable window around an equalizer tap having concentrated energy, wherein the variable window has a size that is variable from one equalizer update period to another depending on a current channel impulse response (CIR) vector associated with the current equalizer update period; and
   filtering the received signal through the reduced number of equalizer taps.

2. The method of claim 1 wherein detecting the single path scenario comprises dividing an energy value of a tap of the current CIR vector having concentrated energy by a total energy value in a plurality of taps of the current CIR vector to produce a tap energy ratio.

3. The method of claim 2 wherein the single path scenario is detected when the tap energy ratio is greater than a predetermined threshold.

4. The method of claim 2 wherein the total energy value is computed as $$E_{tot} = \sum_{k=0}^{K-1} \|h(k)\|^2$$

where $\{h(k), k=0, 1, \ldots, K-1\}$ denotes the current CIR vector having K taps.

5. The method of claim 4 wherein the current CIR vector tap having concentrated energy is computed as $$E_{max} = \max_{k=0,\ldots,K-1} \|h(k)\|^2.$$

6. The method of claim 5 wherein the tap energy ratio is computed as $$\eta = \frac{E_{max}}{E_{tot}}.$$

7. The method of claim 1 wherein the variable window is centered at $$k^* = \operatorname*{argmax}_{k=0,\ldots,K-1} \|c(k)\|^2$$

where $\{c(k), k=0, 1, \ldots, K-1\}$ denotes equalizer taps computed for the current equalizer update period.

8. The method of claim 2 wherein the variable window size varies inversely with the tap energy ratio.

9. The method of claim 8 wherein values for equalizer taps outside the variable window have a value of zero.

10. The method of claim 8 wherein the reduced number of equalizer taps are the number of taps within the variable window.

11. A wireless receiver comprising:
    a wireless communications transceiver and associated antenna(s) capable of sending and receiving wireless communications signals;
    a modem coupled to the transceiver comprising processor(s) for processing signals and executing code stored in a memory;
    a power management unit coupled to the modem and the transceiver for measuring and controlling transmit power; and
    a memory coupled to the modem for storing instructions for detecting a single path scenario, reducing a number of equalizer taps in a current equalizer update period using a variable window around an equalizer tap having concentrated energy, wherein the variable window has a size that is variable from one equalizer update period to another depending on a current channel impulse response (CIR) vector associated with the current equalizer update period, and filtering the received signal through the reduced number of equalizer taps.

12. The wireless receiver of claim 11 wherein detecting the single path scenario comprises dividing an energy value of a tap of the current CIR vector having concentrated energy by a total energy value in a plurality of taps of the current CIR vector to produce a tap energy ratio.

13. The wireless receiver of claim 12 wherein the single path scenario is detected when the tap energy ratio is greater than a predetermined threshold.

14. The wireless receiver of claim 12 wherein the total energy value is computed as $$E_{tot} = \sum_{k=0}^{K-1} \|h(k)\|^2$$

where $\{h(k), k=0, 1, \ldots, K-1\}$ denotes the current CIR vector having K taps.

15. The wireless receiver of claim 14 wherein the current CIR vector tap having concentrated energy is computed as $$E_{max} = \max_{k=0,\ldots,K-1} \|h(k)\|^2.$$

16. The wireless receiver of claim 15 wherein the tap energy ratio is computed as $$\eta = \frac{E_{max}}{E_{tot}}.$$

17. The wireless receiver of claim 11 wherein the variable window is centered at $$k^* = \underset{k=0,\ldots,K-1}{\operatorname{argmax}} \|c(k)\|^2$$

where $\{c(k), k=0, 1, \ldots, K-1\}$ denotes equalizer taps computed for the current equalizer update period.

18. The wireless receiver of claim 12 wherein the variable window size varies inversely with the tap energy ratio.

19. The wireless receiver of claim 18 wherein values for equalizer taps outside the variable window have a value of zero.

20. The wireless receiver of claim 18 wherein the reduced number of equalizer taps are the number of taps within the variable window.

21. A computer readable, non-transitory, medium having instructions stored thereon to cause a processor in a wireless device to:
    detect a single path scenario;
    reduce a number of equalizer taps in a current equalizer update period using a variable window around an equalizer tap having concentrated energy, wherein the variable window has a size that is variable from one equalizer update period to another depending on a current channel impulse response (CIR) vector associated with the current equalizer update period; and
    filter a received signal through the reduced number of equalizer taps.

22. The computer readable medium of claim 21 wherein detecting the single path scenario comprises dividing an energy value of a tap of the current CIR vector having concentrated energy by a total energy value in a plurality of taps of the current CIR vector to produce a tap energy ratio.

23. The computer readable medium of claim 22 wherein the single path scenario is detected when the tap energy ratio is greater than a predetermined threshold.

24. The computer readable medium of claim 22 wherein the total energy value is computed as $$E_{tot} = \sum_{k=0}^{K-1} \|h(k)\|^2$$

where $\{h(k), k=0, 1, \ldots, K-1\}$ denotes the current CIR vector having K taps.

25. The computer readable medium of claim 24 wherein the current CIR vector tap having concentrated energy is computed as $$E_{max} = \max_{k=0,\ldots,K-1} \|h(k)\|^2.$$

26. The computer readable medium of claim 25 wherein the tap energy ratio is computed as $$\eta = \frac{E_{max}}{E_{tot}}.$$

27. The computer readable medium of claim 21 wherein the variable window is centered at $$k^* = \underset{k=0,\ldots,K-1}{\operatorname{argmax}} \|c(k)\|^2$$

where $\{c(k), k=0, 1, \ldots, K-1\}$ denotes equalizer taps computed for the current equalizer update period.

28. The computer readable medium of claim 22 wherein the variable window size varies inversely with the tap energy ratio.

29. The computer readable medium of claim 28 wherein values for taps outside the variable window have a value of zero.

30. The computer readable medium of claim 28 wherein the reduced number of equalizer taps are the number of taps within the variable window.

31. A method for receiving a wireless communication signal comprising:
    finding a total energy value in a channel impulse responses (CIR) vector associated with a current equalizer update period;
    determining an energy value of a tap of the CR vector having a largest concentrated energy;
    dividing the energy value of the CIR vector tap having the largest concentrated energy by the total energy value to produce a tap energy ratio;
    determining a single path scenario when the tap energy ratio is greater than a predetermined threshold;
    computing a window of equalizer taps around an equalizer tap in the current equalizer update period having the largest concentrated energy; and
    filtering the received wireless communications signal using only the equalizer taps inside the window.

32. An apparatus for receiving a wireless communication signal comprising:
    means for finding a total energy value in a channel impulse responses (CIR) vector associated with a current equalizer update period;
    means for determining an energy value of a tap of the CIR vector having a largest concentrated energy;
    means for dividing the energy value of the CIR vector tap having the largest concentrated energy by the total energy value to produce a tap energy ratio;
    means for determining a single path scenario when the tap energy ratio is greater than a predetermined threshold;
    means for computing a window of equalizer taps around an equalizer tap in the current equalizer update period having the largest concentrated energy; and
    an equalizer for filtering the received wireless communications signal using only the equalizer taps inside the window.

* * * * *